(12) United States Patent
Hintzman

(10) Patent No.: US 7,467,764 B2
(45) Date of Patent: Dec. 23, 2008

(54) FUSELAGE MOUNTED EVACUATION SLIDE SYSTEM

(75) Inventor: Roland D. Hintzman, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 217 days.

(21) Appl. No.: 11/549,024

(22) Filed: Oct. 12, 2006

(65) Prior Publication Data
US 2008/0099621 A1  May 1, 2008

(51) Int. Cl.
*B64C 1/12* (2006.01)
(52) U.S. Cl. .................. 244/137.2; 244/905; 182/48; 193/5; 193/25 C
(58) Field of Classification Search ............. 244/137.1, 244/137.2, 905; 182/48; 193/5, 25 C
See application file for complete search history.

(56) References Cited

U.S. PATENT DOCUMENTS

| | | | |
|---|---|---|---|
| 3,465,991 A | 9/1969 | Banas et al. ............ 244/137 |
| 4,013,247 A | 3/1977 | Giffin ..................... 244/137 |
| 5,102,070 A | 4/1992 | Smialowicz et al. ...... 244/137 |
| 5,988,438 A | 11/1999 | Lewis et al. ................. 222/3 |
| 6,443,259 B1 | 9/2002 | Oney et al. ................ 182/48 |
| 6,513,602 B1 | 2/2003 | Lewis et al. ............... 169/84 |
| 6,799,741 B2 | 10/2004 | Danielson et al. ....... 244/137.2 |
| 6,814,183 B2 * | 11/2004 | Horvath et al. ............ 182/48 |
| 6,959,658 B2 * | 11/2005 | Gronlund et al. ...... 112/475.01 |
| 6,966,414 B2 | 11/2005 | Zonneveld ................. 193/5 |
| 2002/0162916 A1 * | 11/2002 | Baderspach et al. .... 244/137.2 |
| 2004/0094671 A1 * | 5/2004 | Moro et al. ............ 244/137.2 |

* cited by examiner

*Primary Examiner*—John W Eldred
(74) *Attorney, Agent, or Firm*—Jerry J. Holdan; John D. Titus

(57) ABSTRACT

An inflatable evacuation slide system includes a slide pack that is ejected from its enclosure by means of an ejection bag, which inflates rapidly to force the evacuation slide out of the enclosure. The high accelerations imposed on the uninflated evacuation slide by the ejection bag make the slide prone to tearing on the edge of the fuselage as the slide pack is forced through the opening. Accordingly, the enclosure is provided with a chafing skirt, which comprises a flexible collar that deploys outward from the enclosure and lays flat against the aircraft fuselage to provide a smooth transition region between the enclosure and the aircraft skin.

19 Claims, 5 Drawing Sheets

FUSELAGE MOUNTED EVACUATION SLIDE SYSTEM

BACKGROUND OF THE INVENTION

The present invention relates to emergency evacuation equipment for aircraft, in particular to inflatable aircraft evacuation slides.

The requirement for reliably evacuating airline passengers in the event of an emergency is well-known. A conventional method of quickly evacuating a large number of passengers from an aircraft is to provide multiple emergency exits, each of which is equipped with an inflatable evacuation slide. Door-mounted emergency evacuation slides are typically contained within an enclosure mounted to the interior surface of the aircraft exit door. Opening of the door in the "armed" position causes the slide to be pulled downward out of the enclosure into a position immediately outboard of and below the door exit opening. The evacuation slide is then rapidly inflated to form a structure sufficiently rigid to enable the airline passengers to escape. Over-wing evacuation slides are typically mounted outside the pressurized aircraft fuselage in a compartment located within the wing-to-fuselage fairing. If an over-wing exit is opened, a signal is generated that causes the over-wing evacuation slide inflation system to begin inflation. In response to the inflation pressure signal, pneumatic locks are released, which allow the evacuation slide compartment cover to fall away. The expanding evacuation slide then is forced out of the compartment either by the action of the slide itself inflating or in some cases by means of a separate ejection bag that inflates and forces the uninflated evacuation slide horizontally out of the storage compartment prior to the inflation thereof.

Fuselage mounted evacuation slides present special difficulties. As with door-mounted and over-wing-mounted evacuation slides, weight and storage volume are of great concern. The requirement that the evacuation slide be fuselage-mounted, however, imposes an additional constraint in that since the evacuation slide compartment intrudes into the pressure hull of the aircraft, the compartment opening must be minimized to avoid placing undue stress on the aircraft skin and supporting airframe. The minimum opening constraint, in turn, causes difficulty in the rapid deployment of the evacuation slide, which must be forced through this minimal opening without tearing on the surrounding aircraft skin.

SUMMARY OF THE INVENTION

The present invention comprises an inflatable evacuation slide system for mounting to the airframe of an aircraft. According to an embodiment of the present invention, the evacuation slide system comprises a packboard compartment comprising a rigid enclosure that is mounted to the fuselage of the aircraft. The enclosure has a cover panel that is released prior to deployment of the inflatable evacuation slide. An inflatable evacuation slide or combination evacuation slide/raft is stored in an uninflated condition within the rigid enclosure. An ejection bag, which comprises an inflatable pillow is located within the rigid enclosure behind the stored evacuation slide. In response to the aircraft exit door being opened in the armed condition, a signal is sent to the gas generator (which may be any source of inflation gas, including stored gas, pyrotechnic, or hybrid gas generator) to begin the inflation process. Gas pressure from the gas generator operates the pneumatic locks to release the cover panel as inflation gases begin to flow to the ejection bag and the inflatable evacuation slide. The ejection bag inflates rapidly to force the evacuation slide out of the rigid enclosure prior to inflation thereof. Because of the high accelerations imposed on the uninflated evacuation slide by the ejection bag, the evacuation slide is prone to tearing on the edge of the fuselage opening as it is forced through. Accordingly, the enclosure is provided with a chafing skirt attached to the inner surface of the rigid enclosure. The chafing skirt comprises a flexible hat-section collar that deploys outward from the enclosure and lays flat against the aircraft fuselage to provide a smooth transition region between the enclosure and the aircraft skin. The transition region enables the rapid deployment of the evacuation slide through the minimal sized opening without damage.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
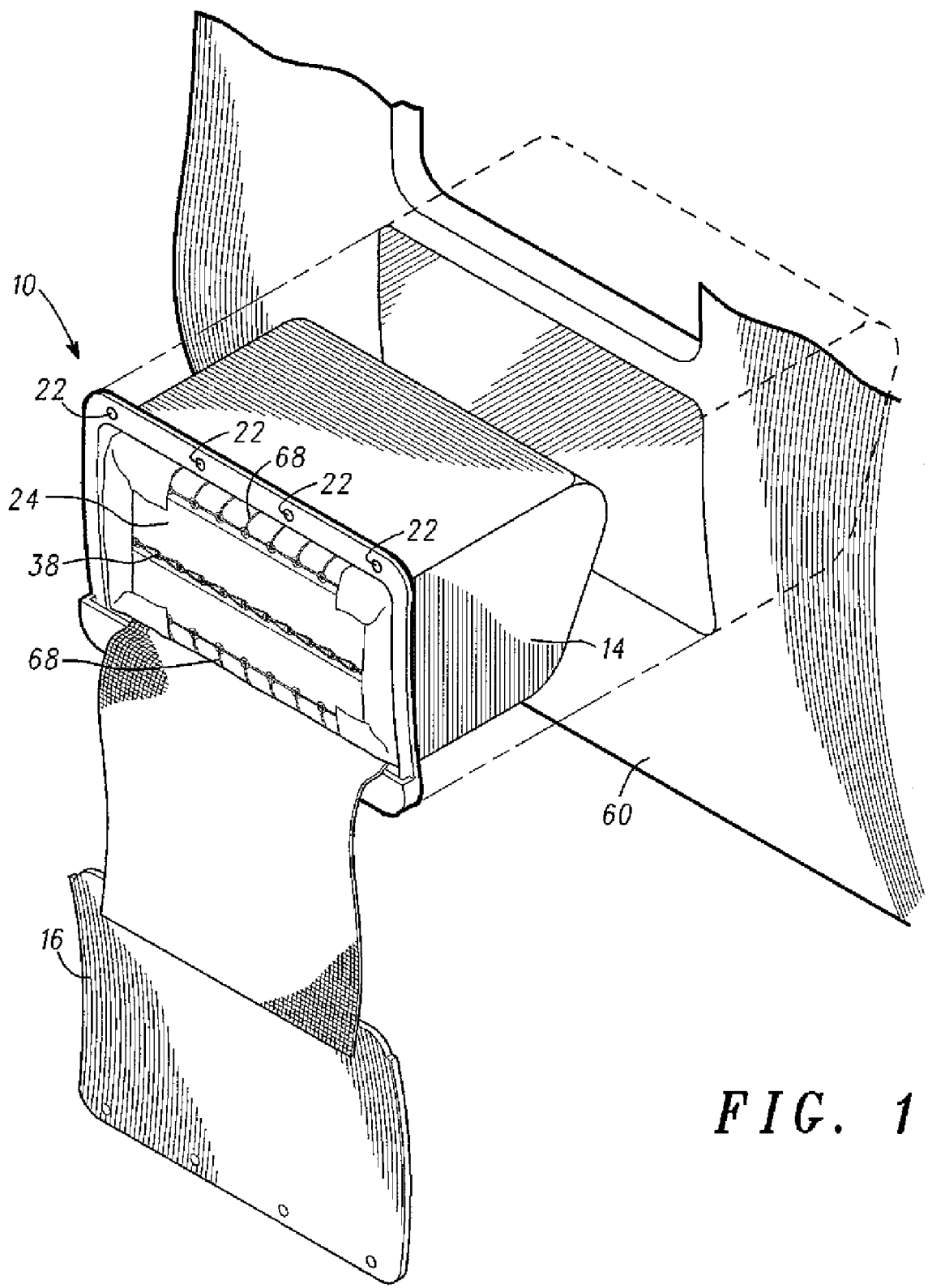
FIG. 1 is a perspective view of an inflatable evacuation slide system incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and the detailed description are not intended to limit the invention to the particular form disclosed, but are merely illustrative and intended to teach one of ordinary skill how to make and/or use the invention claimed herein and for setting forth the best mode for carrying out the invention.

With reference to FIGS. 1-5, emergency evacuation slide system 10 comprises an inflatable evacuation slide 11 which comprises a conventional flexible panel that defines a slide surface having a head end and a foot end supported by a plurality of inflatable tubular members that extend from the head end toward the foot end of the slide. Inflatable evacuation slide 11 is stored in a folded, uninflated condition referred to as a slide pack 12 contained within a rigid enclosure or packboard 14. Packboard 14 is closed by means of a packboard cover panel 16, which is mounted to packboard 14 along the lower edge by means of a tongue 18 formed in packboard cover panel 16, which engages a groove 20 formed along the lower edge of packboard 14. Packboard cover panel 16 is retained to packboard 14 along the upper edge by means of a plurality of pneumatic locks 22. Tongue 18 and groove 20 cooperate to form a detachable hinge which, in cooperation with pneumatic locks 22, allow packboard cover panel 16 to open and fall away from packboard 14 when pneumatic locks 22 are actuated.

The folded, uninflated evacuation slide 12 is held within packboard 14 by means of a slide pack soft cover 24. Soft cover 24 comprises one or more fabric panels 26 and 28, which are attached to the inner surface 30 of packboard 14. The proximal edges 32 and 34 of fabric panels 26 and 28 include a plurality of grommets. Fabric panels 26 and 28 are laced together by means of speed-lacing 38 which is threaded through grommets 36. Thus laced together, fabric panels 26 and 28 form a barrier that holds slide pack 12 within packboard 14 spaced apart from cover panel 16 so that slide pack 12 is incapable of pressing against cover panel 16 during normal storage. An ejection bag 58 is disposed within packboard 14 immediately behind slide pack 12. As explained more fully hereinafter, ejection bag 58 is used to rapidly push slide pack 12 out of packboard 14 during deployment.

Emergency evacuation slide system 10 further includes an inflation source 40. Inflation source 40 may comprise a stored cold gas, a pyrotechnic gas generator or any other source of inflation gas known in the art, but preferably comprises a hybrid gas generator such as the gas generator disclosed in U.S. Pat. No. 5,988,438 to Lewis et al. the specification of which is incorporated herein by reference.

Figure 7:
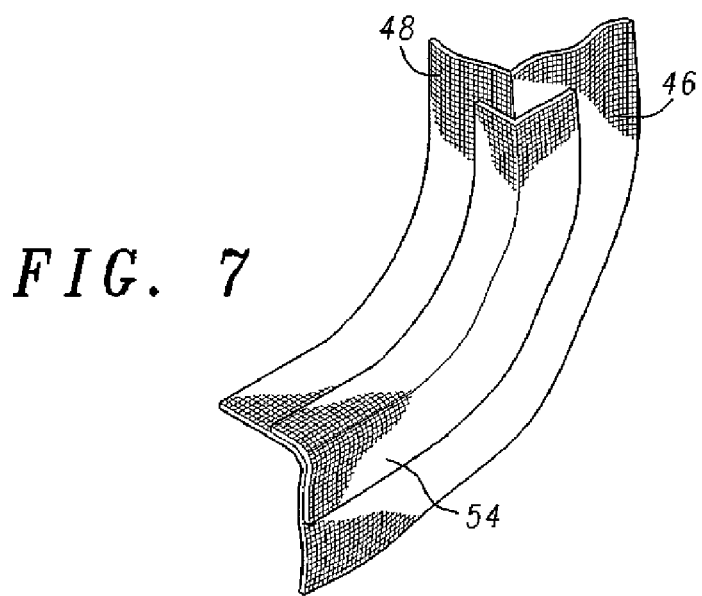
FIG. 7 is a partial perspective view of a chafing skirt in accordance with the illustrative embodiment.
Figure 8:
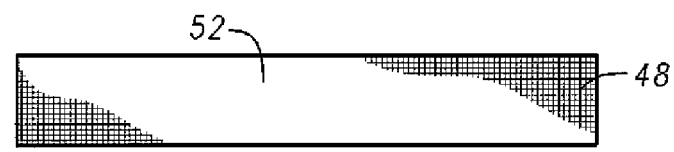
FIG. 8 is a plan view of the chafing skirt of FIG. 7 prior to assembly.
Figure 8:
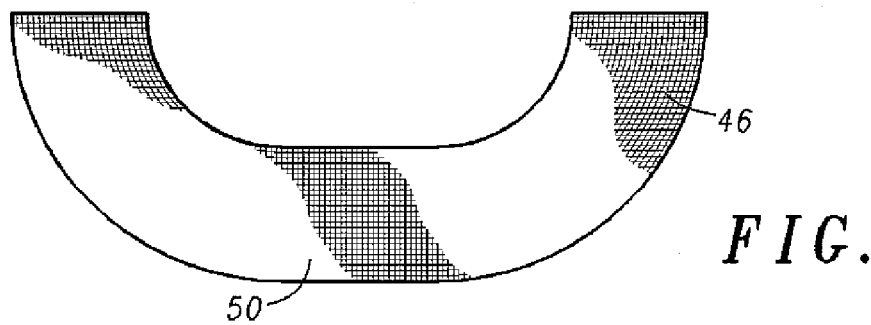
Figure 9:
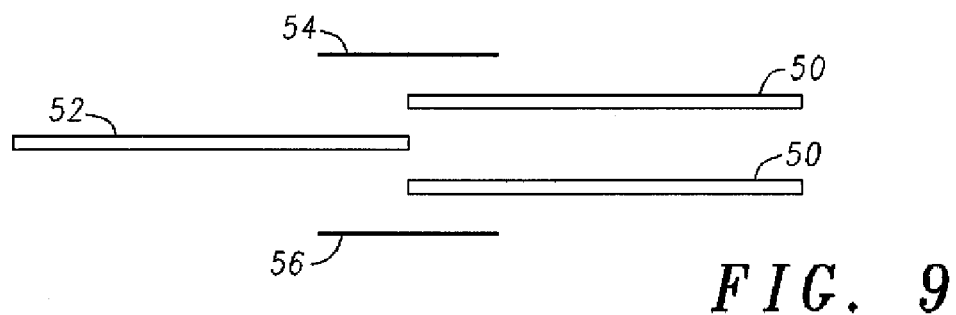
FIG. 9 is a cross-sectional view showing details of assembly of the chafing skirt of FIG. 7.

Emergency evacuation slide system 10 further includes one or more chafing skirts 42 and 44. With further reference to FIGS. 7-9, each of chafing skirts 42 and 44 comprises a flexible fabric flange section 46 and a flexible fabric throat section 48. Flange section 46 comprises an arcuate sector 50 formed of a flexible fabric material, preferably a polyurethane coated, low coefficient of friction fabric with a single-ply plain weave, high tenacity, 840 denier nylon base cloth, which is commonly used in the industry for fabrication of evacuation slide surfaces and other evacuation slide parts. Throat section 48 comprises a rectangular section 52 also composed of a polyurethane coated, aluminized nylon fabric. Two of arcuate sectors 50 and one rectangular section 52 are butt-spliced together as shown in FIG. 9 by means of two strips 54 and 56 of polyurethane coated nylon fabric scam tape. Strips 54 and 56 may be any variety of seam tape commonly used in the fabrication of evacuation slides, however, preferably strips 54 and 56 are made from type 3454 seam tape manufactured by Uretek, Inc. The joining of arcuate sectors 50 with rectangular section 52 forms chafing skirt 42 into a flattened bell or partial hat-section collar which causes flange section 46 to lay flat against the aircraft fuselage 60 when deployed.

Figure 2:
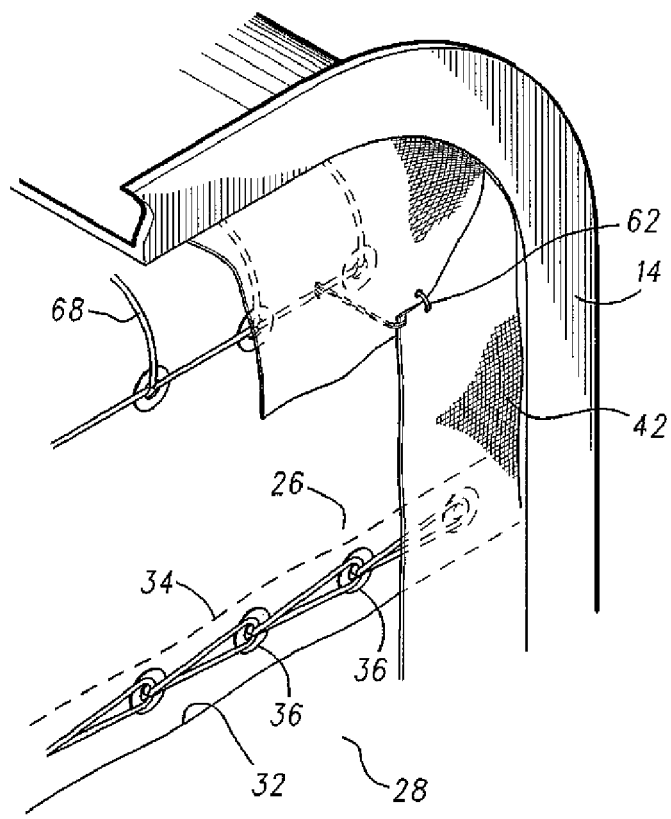
FIG. 2 is an enlarged perspective view of a portion of the inflatable evacuation slide system of FIG. 1.
Figure 3:
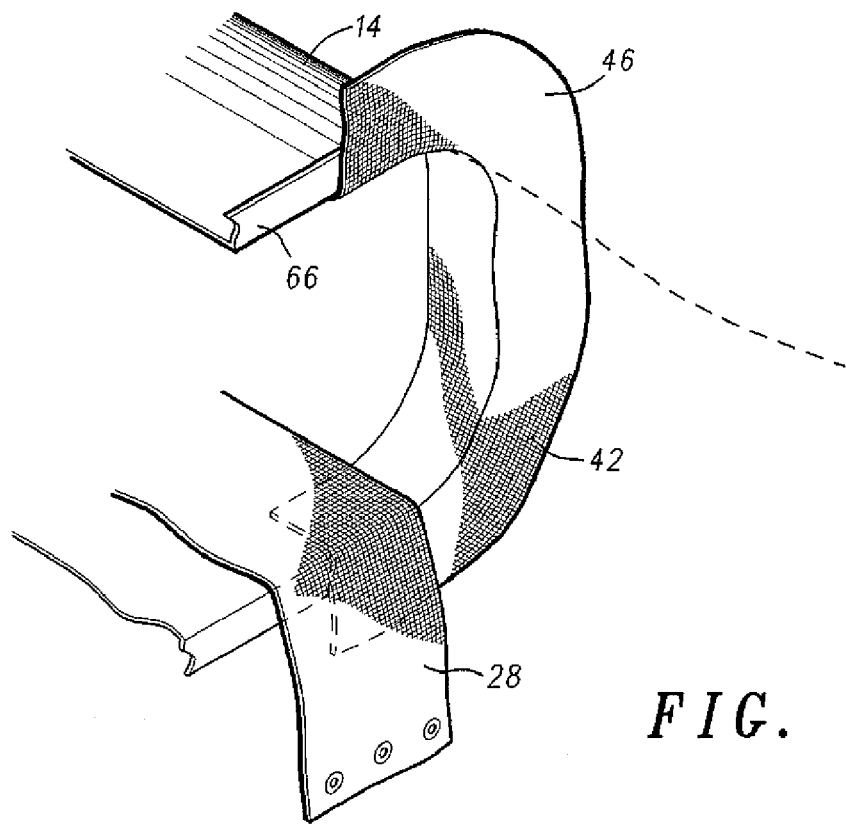
FIG. 3 is a partial perspective view of the inflatable evacuation slide system of FIG. 1 showing certain details of construction.
Figure 4:
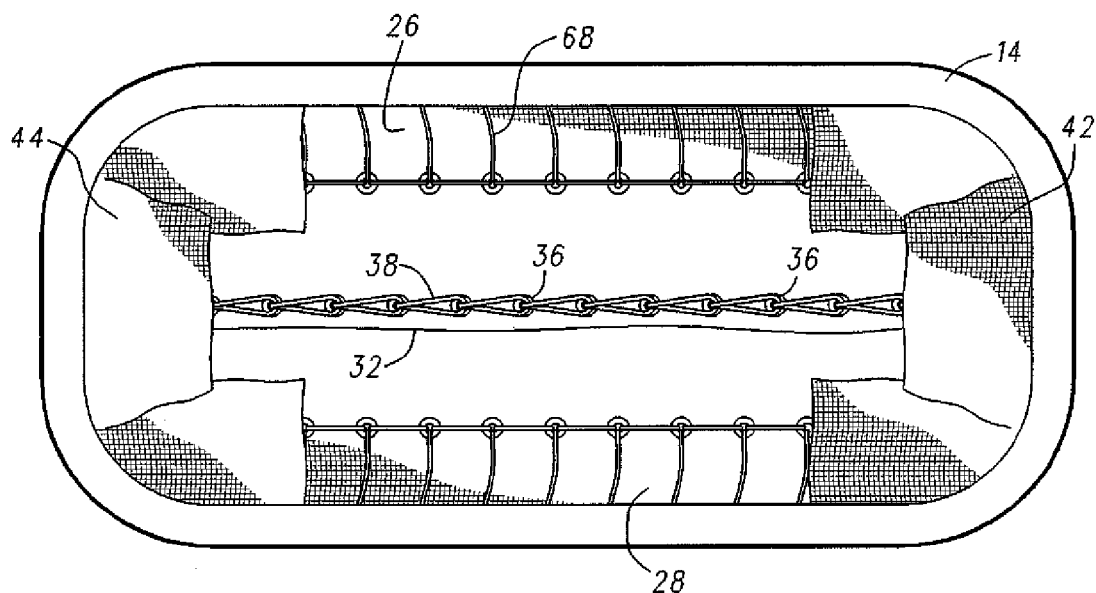
FIG. 4 is a plan view of the inflatable evacuation slide system of FIG. 1 viewed from outside the aircraft.
Figure 5:
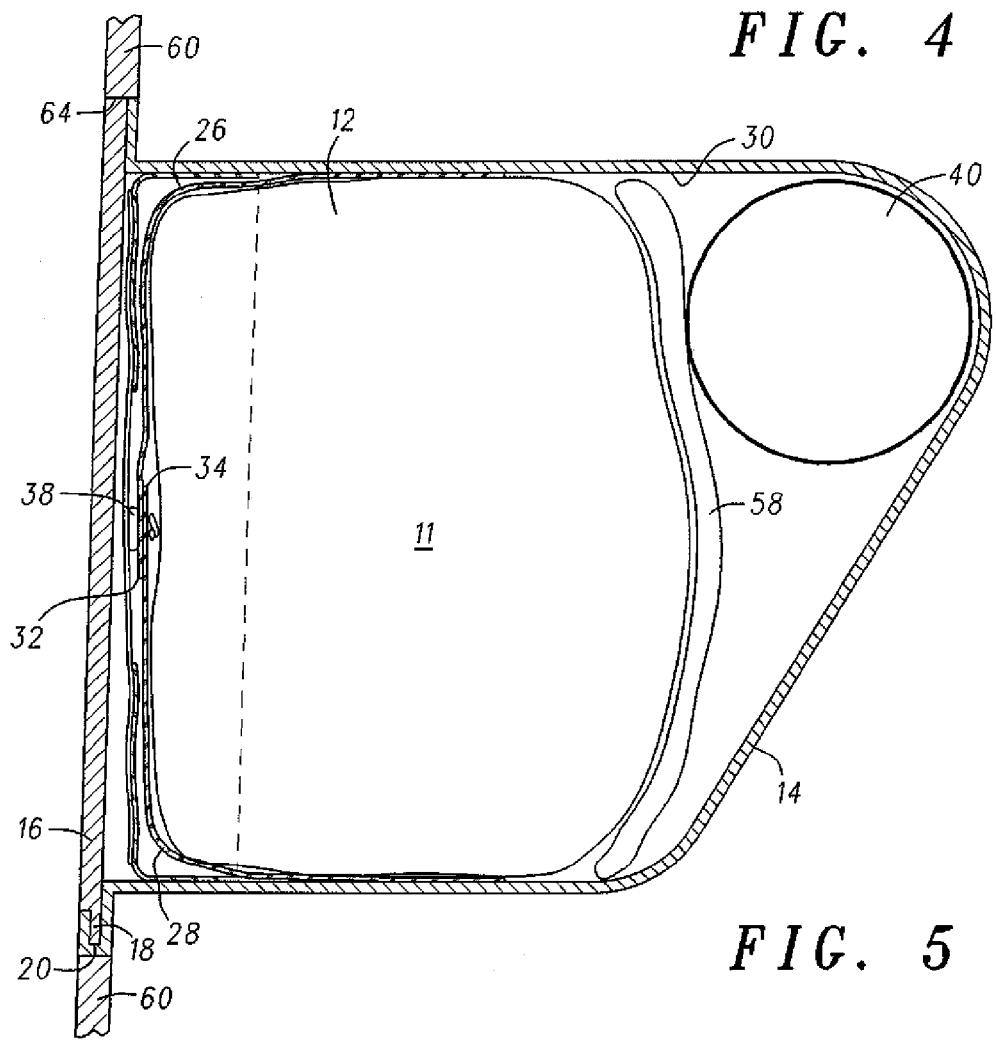
FIG. 5 is a cross-sectional view of the inflatable evacuation slide system of FIG. 1 showing the inflatable evacuation slide in its stored, uninflated condition.
Figure 6:
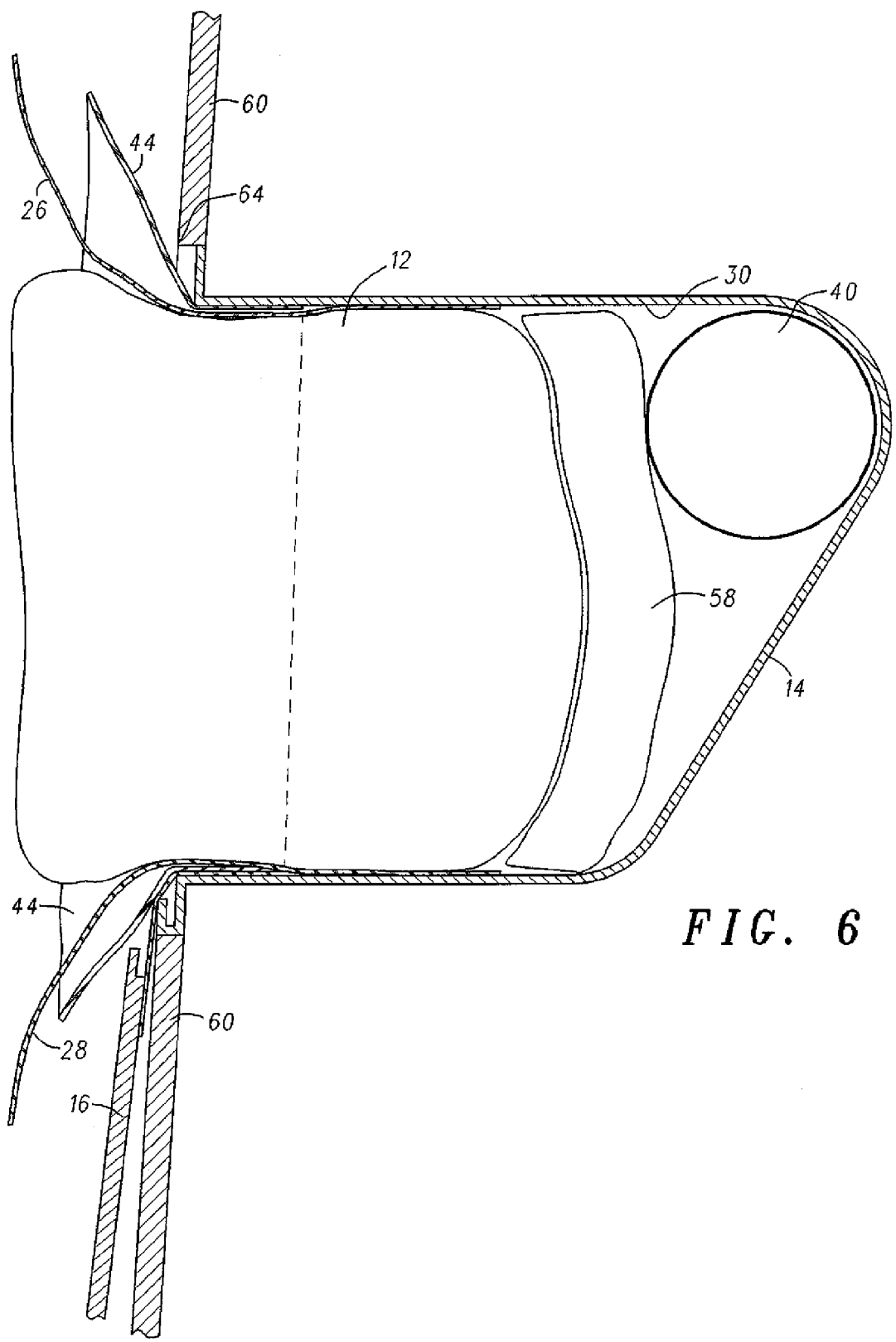
FIG. 6 is a cross-sectional view of the inflatable evacuation slide system in the initial stages of deployment.

As shown most clearly in FIGS. 2 and 4, chafing skirt 42 is stored by folding flange section 46 inward on top of itself so that it lays against the surface of soft cover 24. A safety loop 62 of light gage thread is then stitched through the fold and attached to pack lacing 68.

In operation, when an aircraft emergency exit door is opened in the armed condition, a signal is sent to inflation source 40. In response to the signal, a valve is opened, which begins the flow of inflation gases to the slide pack components. In response to the pressure signal, the pneumatic locks 22 release cover panel 16 which falls and/or is pushed away by the moving slide pack 12. Simultaneously, a pyrotechnic cord cutter (not shown) cuts the speed lacing 38 holding together the fabric panels 26 and 28 of soft cover 24. This allows fabric panels 24 and 26 to fall away from each other thereby releasing slide pack 12 to move. Also simultaneously, inflation gases entering ejection bag 58 cause the rapid expansion of ejection bag 58 which in turn, forces slide pack 12 rapidly out of packboard 14. The force of ejection bag 58 breaks safety loops 62, which allows chafing skins 42 and 44 to deploy prior to slide pack 12 exiting packboard 14. Because of the high acceleration forces, slide pack 12 is highly prone to chafing and/or tearing on the corners 64 of aircraft fuselage 60. Chafing skirts 42 and 44, however, prevent damage to slide pack 12 by deploying outward from packboard 14 and assuming their hat-section configuration, prior to slide pack 12 coming into contact with fuselage 60. In the illustrative example, the width of flange section 46 is approximately six inches as compared with the flange area 66 of packboard 14 which is approximately two inches in width, however, the width of flange section 46 may be any width provided it is sufficiently wide to deploy under the urging of slide pack 12 and extend over the edge 64 of aircraft fuselage 60.

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principals of applicable law. As used herein unless otherwise specifically defined, the terms "substantially" or "generally" when used with mathematical concepts or measurements mean within plus or minus ten degrees of angle or within ten percent of the measurement, whichever is greater.

What is claimed is:

1. An emergency evacuation slide system for mounting to the airframe of an aircraft, comprising
    a packboard compartment comprising a rigid enclosure comprising an inner surface having rear and lateral sides and an open end covered by a releasable cover panel, said cover panel having an upper edge and a lower edge, said rigid enclosure being mounted within said aircraft with said open end substantially flush with the outer surface of said airframe;
    a source of inflation gas;
    an inflatable evacuation slide fluidically connected to said source of inflation gas and stored in an uninflated condition within said rigid enclosure of said packboard compartment;
    a soft cover for retaining said uninflated evacuation slide within said rigid enclosure, said soft cover comprising at least one fabric panel attached to said packboard compartment, said at least one fabric panel having a plurality of edges laced together with a flexible cord to form a barrier;
    means for forcing the uninflated evacuation slide out of the packboard compartment prior to inflation of said evacuation slide; and
    a chafing skirt attached to the inner surface of said rigid enclosure, said chafing skirt comprising a flexible panel having an inner edge attached to the inner surface of said rigid enclosure proximal the open end thereof, said flexible panel further comprising an outer edge capable of extending from a stored position wherein said flexible panel is fully within said rigid enclosure to a deployed position in which said outer edge of said flexible panel extends outside said open end of said rigid enclosure and outside said airframe.

2. The emergency evacuation slide system of claim 1, wherein:
    said open end of said rigid enclosure opens in a substantially horizontal direction and wherein said releasable cover panel includes a detachable hinge along the bottom edge thereof.

3. The emergency evacuation slide system of claim 1, wherein:
said chafing skirt comprises a throat section and a flange section, said throat section comprising a flexible fabric panel substantially parallel to the inner surface of said rigid enclosure, said comprising a flexible fabric panel disposed in a deployed condition substantially perpendicular to the throat section.

4. The emergency evacuation slide system of claim 3, wherein
said throat section comprises a substantially rectangular fabric panel in plan view and said flange section comprises an arcuate sector in plan view.

5. The emergency evacuation slide system of claim 1, further comprising:
a safety loop, said safety loop securing said flange section to said soft cover.

6. The emergency evacuation slide system of claim 5, wherein:
said safety line is attached to said flexible cord.

7. The emergency evacuation slide system of claim 1, further comprising:
a plurality of pneumatic ball locks for securing the upper edge of said cover panel to said rigid enclosure, said pneumatic ball locks being responsive to a pressure signal from said source of inflation gas for releasing the upper edge of said cover panel prior to inflation of said inflatable evacuation slide.

8. The emergency evacuation slide system of claim 1, wherein:
said means for forcing the uninflated evacuation slide out of the packboard compartment comprises an ejection bag, said ejection bag comprising an inflatable pillow disposed in an uninflated condition between said uninflated evacuation slide and the rear side of said rigid enclosure, said ejection bag adapted to expand and force said evacuation slide out of said packboard compartment.

9. The emergency evacuation slide system of claim 1, wherein:
said open end of said rigid enclosure faces in a substantially horizontal direction.

10. The emergency evacuation slide system of claim 1, wherein:
said airframe includes an exit door opening and said rigid enclosure is located immediately adjacent and below said exit door opening.

11. An emergency evacuation slide system for mounting to the airframe of an aircraft, comprising
a packboard compartment comprising a rigid enclosure having a rear surface and first and second lateral surfaces, said packboard compartment having an open end covered by a releasable cover panel, said cover panel having an upper edge and a lower edge, said rigid enclosure being mounted within said aircraft with said open end substantially flush with the outer surface of said airframe;
a source of inflation gas;
an inflatable evacuation slide fluidically connected to said source of inflation gas and stored in an uninflated condition within said rigid enclosure of said packboard compartment;
means for forcing the uninflated evacuation slide out of the packboard compartment prior to inflation of said evacuation slide; and
a chafing skirt attached to the inner surface of said rigid enclosure, said chafing skirt comprising a flexible panel having an inner edge attached to one of said first and second lateral surfaces of said rigid enclosure proximal the open end thereof, said flexible panel further comprising an outer edge capable of extending from a stored position wherein said flexible panel is fully within said rigid enclosure to a deployed position in which said outer edge of said flexible panel extends outside said open end of said rigid enclosure and outside said airframe.

12. The emergency evacuation slide system of claim 11, wherein:
said chafing skirt comprises a throat section and a flange section, said throat section comprising a flexible fabric panel substantially parallel to the inner surface of said rigid enclosure, said comprising a flexible fabric panel disposed in a deployed condition substantially perpendicular to the throat section.

13. The emergency evacuation slide system of claim 12, wherein
said throat section comprises a substantially rectangular fabric panel in plan view and said flange section comprises an arcuate sector in plan view, whereby said chafing skirt is substantially in the form of a partial hat-section.

14. The emergency evacuation slide system of claim 11, further comprising:
a soft cover for retaining said uninflated evacuation slide within said rigid enclosure, said soft cover comprising first and second flexible panels attached to the inner surface of said rigid enclosure, said flexible panels having a plurality of grommets laced together with a flexible cord to form a panel for retaining said uninflated evacuation slide.

15. The emergency evacuation slide system of claim 14, further comprising:
a safety loop, said safety loop securing said flange section to said soft cover.

16. The emergency evacuation slide system of claim 15, wherein:
said safety line is attached to said flexible cord.

17. The emergency evacuation slide system of claim 11, wherein:
said means for forcing the uninflated evacuation slide out of the packboard compartment comprises an ejection bag, said ejection bag comprising an inflatable pillow disposed in an uninflated condition between said uninflated evacuation slide and the rear side of said rigid enclosure, said ejection bag adapted to expand and force said evacuation slide out of said packboard compartment.

18. The emergency evacuation slide system of claim 11, wherein:
said open end of said rigid enclosure faces in a substantially horizontal direction.

19. The emergency evacuation slide system of claim 11, wherein:
said airframe includes an exit door opening and said rigid enclosure is located immediately adjacent and below said exit door opening.

* * * * *